United States Patent
Sekiya (10) Patent No.: US 11,036,972 B2
(45) Date of Patent: Jun. 15, 2021

(54) MANAGEMENT SYSTEM FOR SUPERVISING OPERATOR

(71) Applicant: DISCO CORPORATION, Tokyo (JP)

(72) Inventor: Kazuma Sekiya, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 0 days.

(21) Appl. No.: 16/530,627

(22) Filed: Aug. 2, 2019

(65) Prior Publication Data

US 2019/0354751 A1 Nov. 21, 2019

Related U.S. Application Data

(63) Continuation-in-part of application No. 15/645,160, filed on Jul. 10, 2017, now abandoned.

(30) Foreign Application Priority Data

Jul. 11, 2016 (JP) .................. 2016-137021

(51) Int. Cl.
*G06K 9/00* (2006.01)
*G06K 7/14* (2006.01)
(Continued)

(52) U.S. Cl.
CPC ..... *G06K 9/00335* (2013.01); *G06K 7/10722* (2013.01); *G06K 7/1413* (2013.01);
(Continued)

(58) Field of Classification Search
None
See application file for complete search history.

(56) References Cited

U.S. PATENT DOCUMENTS

| 2004/0186627 A1* | 9/2004 | Watanabe | ............ G05B 19/425 700/264 |
| 2008/0285802 A1* | 11/2008 | Bramblet | ............... G07C 9/15 382/103 |

(Continued)

FOREIGN PATENT DOCUMENTS

| JP | 2005250990 A | 9/2005 |
| JP | 2008305177 A | 12/2008 |

(Continued)

OTHER PUBLICATIONS

Veres G, Grabner H, Middleton L, Van Gool L. Automatic workflow monitoring in industrial environments. InAsian Conference on Computer Vision Nov. 8, 2010 (pp. 200-213). Springer, Berlin, Heidelberg. (Year: 2010).*

(Continued)

*Primary Examiner* — Clifford Hilaire
(74) *Attorney, Agent, or Firm* — Greer Burns & Crain Ltd.

(57) ABSTRACT

A management system for supervising an operator within an operation area with a processing apparatus installed therein has an imaging camera for capturing an image of the operator and a control unit. The control unit stores an area map that includes information about the processing apparatus and the positions of the processing apparatus, acquires identifying information regarding the operator on the basis of the image captured by the imaging camera, and extracts traffic lines of the operator. A management unit records the traffic lines of the operator and the identifying information of the operator, in relation to each other on the area map.

6 Claims, 5 Drawing Sheets

(51) Int. Cl.
*G06K 7/10* (2006.01)
*H04N 5/225* (2006.01)
(52) U.S. Cl.
CPC ....... *G06K 7/1417* (2013.01); *G06K 9/00288* (2013.01); *G06K 9/00771* (2013.01); *H04N 5/2253* (2013.01)

(56) References Cited

U.S. PATENT DOCUMENTS

| | | | | |
|---|---|---|---|---|
| 2010/0088020 | A1* | 4/2010 | Sano | G01C 21/3492 701/533 |
| 2013/0251216 | A1* | 9/2013 | Smowton | G06K 9/6807 382/118 |

FOREIGN PATENT DOCUMENTS

| | | | |
|---|---|---|---|
| JP | 2009146166 | A | 7/2009 |
| WO | 2013145632 | A1 | 10/2013 |

OTHER PUBLICATIONS

Veres et al.; "Automatic workflow monitoring in industrial environments"; InAsian Conference on Computer Vision Nov 8, 2010; (pp. 200-213); Springer, Berlin, Heidelberg (2010).
Padoy et al.; "Workflow Monitoring Based on 3D Motion Features"; In2009 IEEE12th International Conference on Computer Vision Workshops; ICCV Workshops Sep. 27, 2009 (pp. 585-592); IEEE (2009).

* cited by examiner

MANAGEMENT SYSTEM FOR SUPERVISING OPERATOR

CROSS-REFERENCE TO RELATED APPLICATION

This application is a continuation-in-part of prior U.S. application Ser. No. 15/645,160, filed Jul. 10, 2017.

BACKGROUND OF THE INVENTION

Field of the Invention

The present invention relates to a management system for supervising an operator within an operation area.

Description of the Related Art

While an operator in an operation area provided with a plurality of processing apparatus is operating the processing apparatus to process a workpiece, the operator and the supervisor try to make improvements day after day and elaborate on the operation area based on the improvements for increased operation efficiency. For example, guidance information is provided in the operation area to prevent the operator from making mistakes, and the layout of the processing apparatus is altered to reduce the traffic lines of the operator.

Japanese Patent Laid-Open No. 2008-305177, for example, discloses a technology in which a lot case that stores a lot to be processed next by the operator is caused to emit light on the basis of the positional information of the operator and lot information of the lot, thereby indicating the lot case to the operator. The disclosed technology makes it possible to indicate the lot case to the operator efficiently.

In the process of developing suggestions for improvement, it is important to find problems to be improved, such as wastes, excesses, etc. It is impossible to start thinking about suggestions for improvement unless problems to be improved are extracted, and it is impossible to develop viable suggestions for improvement unless problems to be improved are accurately grasped. The operator who actually engages in processing workpieces and the supervisor who supervises the operation area and the operator are not liable to spot problems because of stereotypes that they have come to acquire due to their working experiences.

One solution would be to invite an outside consultant to the operation area and have them point out problems thereof, so that improvements would be made to solve the problems. However, the fee to be paid for such an outside consultant is likely to be prohibitively high. In addition, in view of more deepened improvements having been made and more problems having been solved, it becomes difficult for even a consultant to point out new problems.

To keep the efficiency of operations in the operation area at a high level, it is necessary for the supervisor to appropriately supervise the operator to make the operator perform daily operations properly and efficiently even before attempts are made to come up with improvements. Any suggested improvements will not be effective enough if the operator does not follow procedures and rules and does not work appropriately.

Operation areas in factories for manufacturing semiconductor device chips, for example, are often run on an around-the-clock basis by a minimum number of operators working on processing apparatus. The number of supervisors for supervising the operators is also limited. As those limited supervisors fail to supervise the operation areas at all times, they may not fully grasp the operation areas even when the operators are not working appropriately, and hence the operation areas may be run inefficiently while the supervisor remains ignorant of the situation.

SUMMARY OF THE INVENTION

When starting to attempt to make improvements and managing operators, the behaviors of the operators within the operation areas need to be recorded accurately and in detail. A detailed inspection of the recorded behaviors of the operators makes it easier to find problems of the operation areas and the operators and to supervise the operators appropriately. Particularly, in attempts to make deeper improvements, since it is effective to pay attention to and solve problems caused by individual operators, it is desirable to record the behaviors of the operators individually in detail. The individual records of the behaviors of the operators will lead to an efficient guidance to be given to those operators who tend to fail to follow procedures and rules.

However, producing detailed records causes a lot of trouble recording the operator's behaviors. For example, additional personnel are required to produce detailed records, and the operators may be forced to behave in a special way for making detailed records. When the cost required for records increases, the expenses for running the operation areas become high, resulting in a reduction in the monetary efficiency of the operations, which is problematic by itself. Furthermore, the more detailed the records are, the higher the possibility that the records will contain mistakes becomes.

It is an object of the present invention to provide a management system which will solve the above problems and automatically records the behaviors of an operator without forcing the operator to behave in a special way.

In accordance with an aspect of the present invention, there is provided a management system for supervising an operator within an operation area with a processing apparatus installed therein, including an imaging camera for capturing an image of the operator, a controller and an indicator. The controller includes an area map recorder unit for storing an area map that includes information about the processing apparatus installed in the operation area and information about the positions of the processing apparatus, an identifying information acquirer unit for acquiring identifying information regarding the nature of the operator on the basis of the image captured by the imaging camera, a traffic line extractor unit for extracting traffic lines of the operator from the image captured by the imaging camera, and a management unit connected to the area map recorder unit, the identifying information acquirer unit, and the traffic line extractor. The management unit has a function to record the traffic lines of the operator which have been extracted by the traffic line extractor unit and the identifying information of the operator, in relation to each other on the area map read from the area map recorder unit.

In the management system according to the aspect of the invention, the controller further may include an appropriate pattern storage unit for storing an appropriate pattern predefined for the traffic patterns of the operator, and a decision unit connected to the management unit, the appropriate pattern storage unit, and the indicator. The decision unit may have a function to perform a decision process for reading the appropriate pattern from the appropriate pattern storage unit and determining whether the recorded traffic lines and the appropriate pattern agree or disagree with each other. The indicator may have a function to indicate the result of the decision process performed by the decision unit.

In the management system according to the aspect of the invention, the controller may further include an operation menu controller unit connected to the management unit and the processing apparatus, for controlling an operation menu for operating the processing apparatus. The management unit may have a function to send the identifying information of the operator to the operation menu controller unit when the operator enters a control area established with respect to the processing apparatus, and the operation menu controller unit may have a function to display an operation menu suitable for the operator on a control panel of the processing apparatus.

The identifying information may be acquired using a face of the operator, a bar code, or a two-dimensional code that is included in the image of the operator captured by the imaging camera. The imaging camera may be mounted on the processing apparatus installed in the operation area. The identifying information may include orientation information representing the orientation of a body of the operator.

The management system according to the present invention is able to accumulate data about the behaviors of the operator without forcing the operator to perform special operations, using an indication or the like that is included in the captured image of the operator. The management system can also record the behaviors of the operator in detail and in an objective way on the basis of the image captured by the imaging camera. As the behaviors of the operator are automatically recorded, there will be no mistake in recording the behaviors of the operator.

The management system according to the present invention makes it possible to make suggestions for improvement based on the area map because the traffic lines of the operators are recorded on the area map. Since the traffic lines of the operators are distinguishably recorded, problems caused individually by the operators can be detected and suggestions for improvement can be made for the respective operators.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

Figure 1:
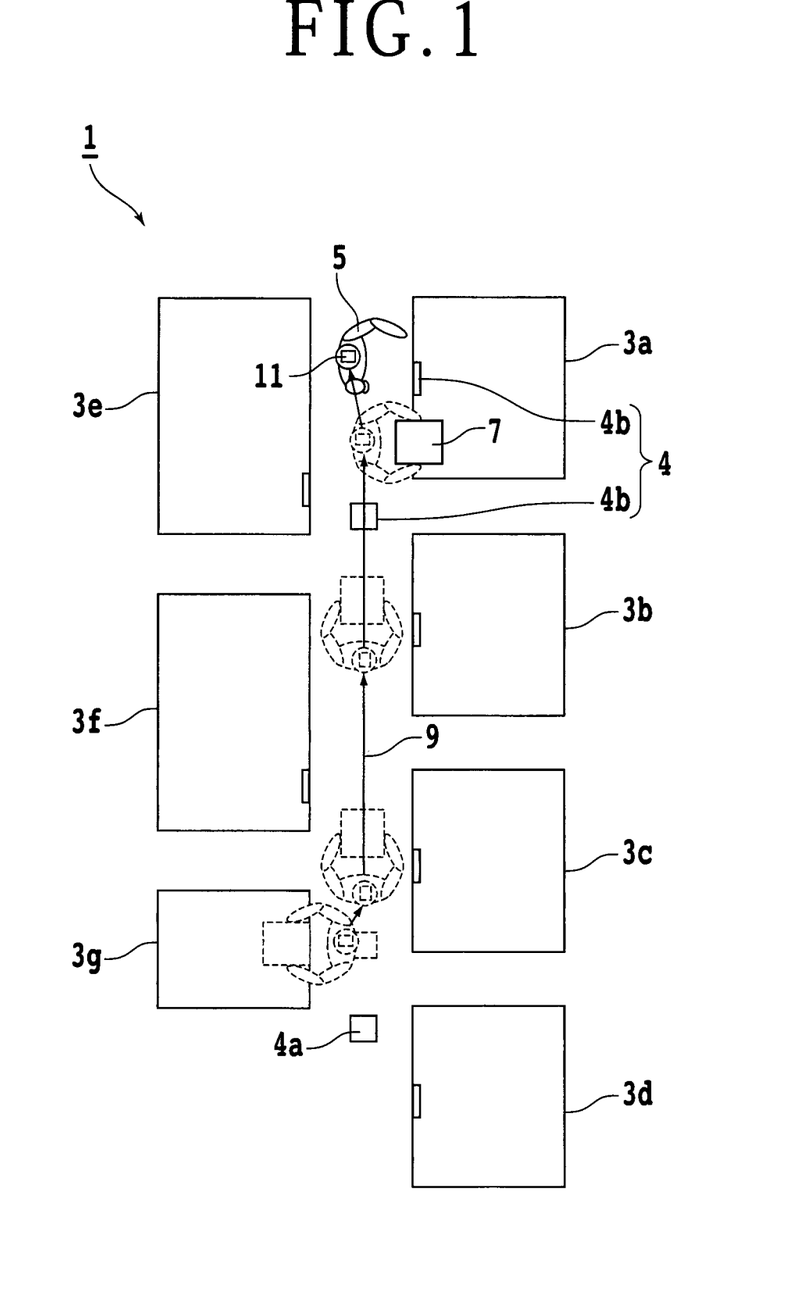
FIG. 1 is a top plan view showing by way of example an operation area and behaviors of an operator therein.

A management system according to a preferred embodiment of the present invention will be described below. First, an operation area to which the management system is applied will be described below with reference to FIG. 1. FIG. 1 shows in plan an operation area 1 by way of example. As shown in FIG. 1, a plurality of processing apparatus 3 (3a through 3g) are disposed in the operation area 1. An operator 5 for operating the processing apparatus 3 (3a through 3g) works in the operation area 1. In the operation area 1, the operator 5 wears working clothes bearing a target 11 to be imaged for acquiring identifying information, to be described later, of the operator 5. The operator 5 delivers a work lot 7 to be processed to one of the processing apparatus 3 for processing the lot 7, attaches the work lot 7 to the processing apparatus 3, and then operates the processing apparatus 3 to process the work lot 7. In FIG. 1, the operator 5 processes the work lot 7 on the processing apparatus 3a. The processing apparatus 3 may be interconnected by a feeder, not shown, which delivers the work lot 7 successively to the processing apparatus 3 without manual intervention of the operator 5.

The operation area 1 belongs to a factory for manufacturing semiconductor device chips, for example. The processing apparatus 3 are processing apparatus used in the manufacture of semiconductor device chips, such as a cutting apparatus, a grinding apparatus, a film formation apparatus, an exposing apparatus, an etching apparatus, a coating apparatus, a cleaning apparatus, etc. The operator 5 is an operator for handling the processing apparatus 3, and the work lot 7 contains a plurality of semiconductor wafers or the like that are to be processed simultaneously. The operation area 1 may be a clean room, and the operator 5 may enter the clean room while wearing a clean suit. The clean suit may be printed with a code or the like that serves as the target 11 to be imaged for acquiring identifying information of the operator 5.

The operation area 1 is provided with one or more imaging cameras 4. In FIG. 1, the imaging cameras 4 include an imaging camera 4a mounted on the ceiling of the operation area 1 and an imaging camera 4b mounted on the processing apparatus 3. The imaging cameras 4 serve as part of the management system according to the present embodiment, and have a function to send captured images to a management unit, to be described later, of the management system. The imaging cameras 4 may have a function to change their imaging directions as instructed by the management unit. The imaging cameras 4 may also have a function to change their imaging directions to track the operator 5 as it moves in order to obtain detailed information about the behavior of the operator 5. The imaging cameras 4 may add information as to the imaging directions to the images captured thereby.

The identifying information of the operator 5 will be described below. The identifying information of the operator 5 refers to information regarding the nature of a predetermined operator 5, information about the predetermined operator 5 themselves, etc. For example, the identifying information of the operator 5 includes information used to supervise the operator 5 working in the operation area 1, such as a personal number assigned to the operator 5 by a person who supervises the operator 5, the name of the operator 5, the department to which the operator 5 belongs, the managerial position of the operator 5, the authority of the operator 5, the level of skill of the operator 5, etc. When the management system records the behavior of the operator 5 working in the operation area 1 together with the identifying information, the management system accumulates information useful for improving operations.

The target 11 to be imaged for acquiring the identifying information will be described below. The target 11 to be imaged for acquiring the identifying information refers to an indication or the like to be analyzed for acquiring the identifying information of the operator 5. When images are captured by the imaging cameras 4, the target 11 is included in the captured images, and the management system according to the present embodiment analyzes the target 11 in the captured images. The target 11 may include, for example, a string of characters or a code, etc. printed on working clothes, a clean suit, a helmet, or the like worn by the operator 5. The code may be a bar code, a two-dimensional code, or the like. If the identifying information of the operator 5 is embedded in the code or the like, the management system can obtain the identifying information of the operator 5 by analyzing the code or the like.

Even if not all the identifying information is contained in the code or the like, the management system 2 can obtain the identifying information of the operator 5 providing the personal number of the operator 5 is contained in the code or the like. Specifically, if all the identifying information is registered in relation to the personal number of the operator 5 in the management system 2, then the personal number of the operator 5 may be read from the imaged target 11, and the information registered in relation to the personal number of the operator 5 may be retrieved as the identifying information of the operator 5. Moreover, the code or the like may not contain any of the identifying information of the operator 5, but may contain an inherent number or the like assigned individually to the working clothes or the like, for example. When the operator 5 enters the operation area 1, information joining the operator 5 and the working clothes worn by the operator 5 may be registered in the management system 2. Then, the management system 2 may read the inherent number or the like assigned individually to the working clothes or the like from the code or the like attached to the working clothes or the like, retrieve the information registered in relation to the inherent number or the like, and obtain the identifying information of the operator 5 who is wearing the working clothes or the like.

As described above, even if the identifying information of the operator 5 is not partly or wholly contained in the target 11 to be imaged for acquiring identifying information, the management system 2 can acquire the identifying information of the operator 5 by analyzing the imaged target 11. The target 11 to be imaged for acquiring identifying information may not be a printed string of characters, a code, or the like. Alternatively, for example, physical features of the operator 5 may be registered in relation to the identifying information of the operator 5 in the management system 2, and the management system 2 may acquire the identifying information of the operator 5 by reading the physical feature from the captured images and analyzing the physical feature. Specifically, the face of the operator 5, for example, may be registered in relation to the identifying information of the operator 5 in the management system 2, and the management system 2 may identify the operator 5 from the face thereof included in the captured images and acquire the identifying information of the operator 5 from the identified face. In this case, the face of the operator 5 serves as the target 11 to be imaged for acquiring identifying information.

Figure 2:
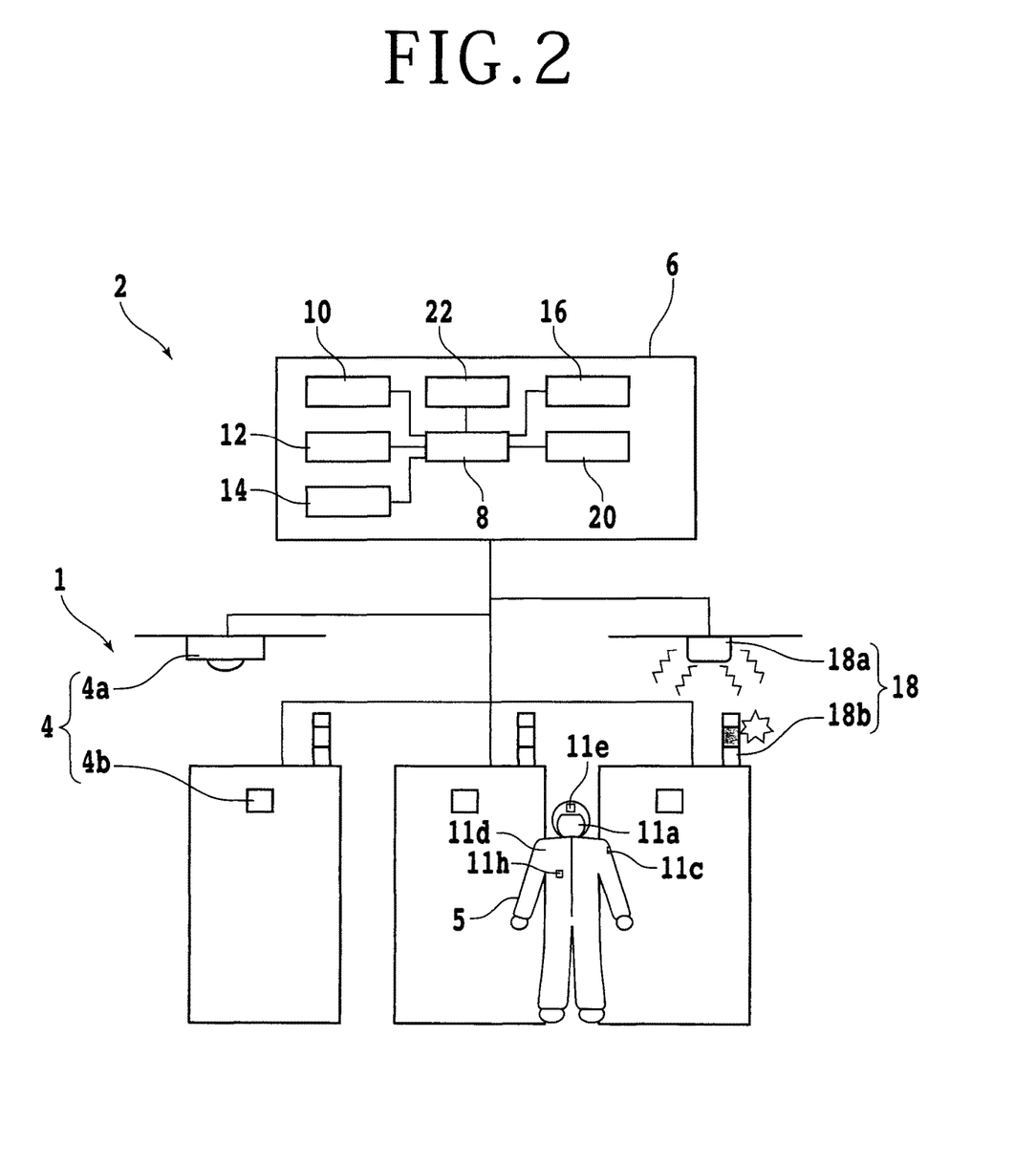
FIG. 2 is a schematic view showing a management system according to an embodiment of the present invention, an operator, and an operation area to which the management system is applied.
Figure 3:
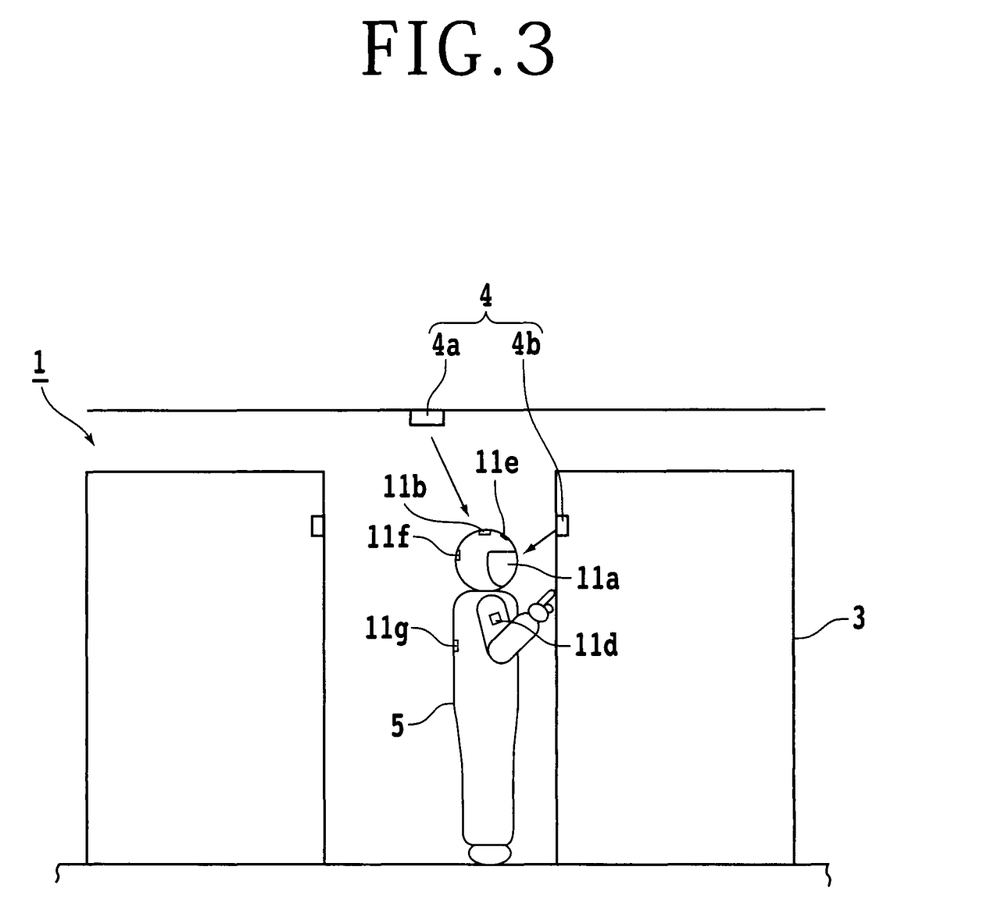
FIG. 3 is a side elevational view showing processing apparatus and an operator operating on one of the processing apparatus.
Figure 4:
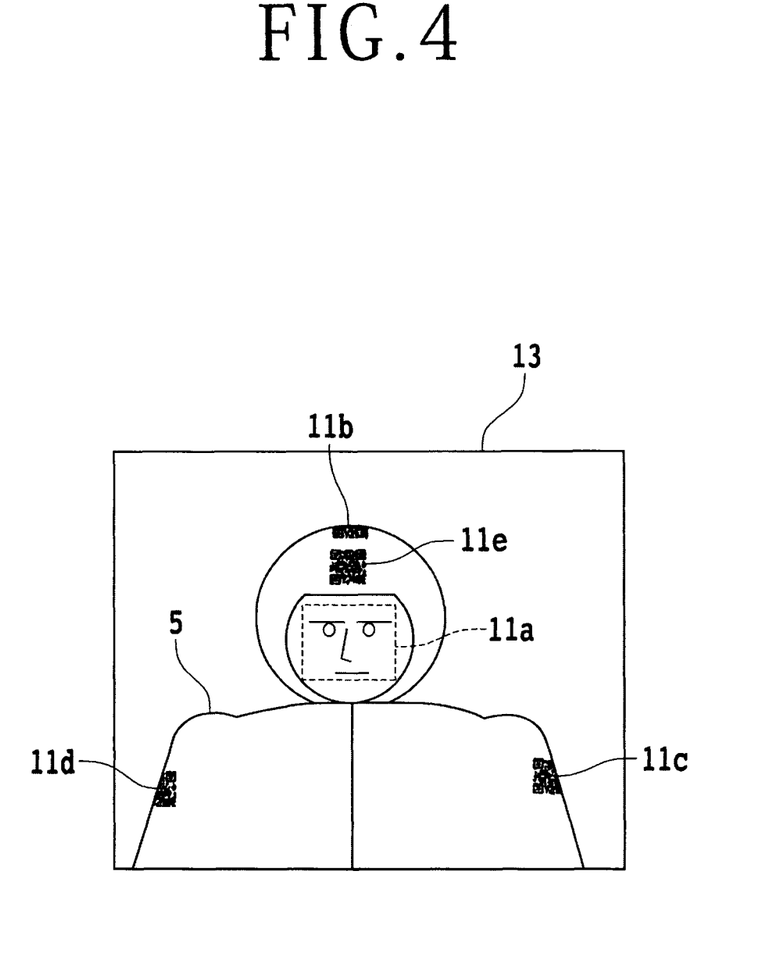
FIG. 4 is a schematic view showing by way of example an image captured by an imaging camera.

FIG. 4 shows by way of example an image 13 captured by the imaging camera 4b mounted on the processing apparatus 3. As shown in FIG. 4, the captured image 13 includes codes printed on the working clothes or the like worn by the operator 5. The captured image 13 also includes the face, denoted by 11a, of the operator 5. If the face 11a of the operator 5 has been registered in relation to the identifying information of the operator 5 in the management system 2, then the management system 2 can acquire the identifying information of the operator 5 using the face 11a of the operator 5. As shown in FIG. 4, a plurality of codes may be applied to the working clothes or the like worn by the operator 5. These codes may not be identical to each other. The codes may include information about the regions of the working clothes or the like where the codes are applied. If this is the case, then the direction in which the operator 5 faces can be acquired as part of the identifying information of the operator 5 from the codes. Specifically, for example, as shown in FIG. 4, the codes applied to the working clothes worn by the operator 5 include a code 11b positioned on the head of the operator 5, a code 11c positioned on the left-hand side of the operator 5, a code 11d positioned on the right-hand side of the operator 5, and a code 11e positioned on the forehead of the operator 5. Furthermore, the codes on the working clothes may also include, as shown in FIGS. 2 and 3, a code 11f positioned on the back of the head of the operator 5, a code 11g positioned on the back of the operator 5, and a code 11h positioned on the front of the operator 5. Information about the orientation of the body of the operator 5 and the orientation of the face of the operator 5 can be acquired by analyzing these codes.

The configuration of the management system 2 according to the present embodiment and the functions of components thereof will be described below with reference to FIGS. 2 and 3. FIG. 2 schematically shows the management system 2, the operator 5, and the processing apparatus 3. The management system 2 supervises the operation area 1 and the operator 5 working in the operation area 1. The management system 2 includes one or more imaging cameras 4 (4a, 4b), a controller 6 and an indicator 18 (18a, 18b). The imaging cameras 4 are mounted on the ceiling or wall of the operation area 1 and one of the processing apparatus 3. In FIGS. 2 and 3, the imaging camera 4a is mounted on the ceiling of the operation area 1 and the imaging camera 4b is mounted on the processing apparatus 3. For recording the behavior of the operator 5 in the operation area 1 in detail, the imaging cameras 4 should preferably be located to compensate each other's blind spots. The imaging cameras 4 include cameras that are used as general monitoring cameras. If the resolution of the imaging cameras 4 is high, then it is possible to grasp the identifying information and behaviors of many operators 5 in detail at the same time. However, if the resolution of the imaging cameras 4 is too high, then the amount of data of images captured thereby is so large that the management system 2 needs to be able to process the large amount of image data and hence is expensive to manufacture.

The controller 6 may be implemented using any type of device capable of processing data, such as a processor. Here, the processor may refer to a hardware built-in data processing device having a circuit physically structured to perform functions expressed in codes or instructions included in computer programs. Examples of the hardware built-in data processing device may include processing devices such as a microprocessor, a central processing unit (CPU), a processor core, a multiprocessor, an application-specific integrated circuit (ASIC), a field programmable gate array (FPGA), etc., but the scope of the present invention is not limited thereto.

The components or units of the controller 6 may be dedicated portions of the processor for performing their respective functions, or they may be representations of different functions performed by the overall controller 6 in response to control instructions provided from a program code. It is also contemplated that the components or units may be implemented as individual processors performing their respective functions.

In another embodiment the components or units of the controller 6 may also be implemented as software programs including codes or instruction, which are executed in one or more hardware devices such as a computer processor. Software programs may be hardcoded or programmed directly in a computer processor, or stored in a storage medium and retrieved and executed by the computer processor. Examples of the software program include not only machine language codes prepared by a compiler but also high-level codes executable by a computer by using an interpreter.

A storage medium may be a non-transitory computer-readable recording medium such as magnetic media (e.g., hard disks, floppy disks, and magnetic tapes), optical media (e.g., CD-ROMs and DVDs), magneto-optical media (e.g., floptical disks), and hardware devices specifically configured to store and execute program commands (e.g., ROMs, RAMs, and flash memories).

The controller 6 includes a management unit 8, an area map recorder unit 10, an identifying information acquirer unit 12, and a traffic line extractor unit 14. The controller 6 may also include an appropriate pattern storage unit 16, a decision unit 20, and an operation menu controller unit 22.

The functions of the components of the management system 2 will be described below. First, the management unit 8 is connected to the other units, described above, of the controller 6, and has a function to control those units. The management unit 8 has a memory, not shown, for storing information, etc. sent from the other components of the controller 6. The area map recorder unit 10 has a function to store and record a basic area map that includes information about the processing apparatus 3 installed in the operation area 1 and information about the layout of the processing apparatus 3. The area map recorder unit 10 stores the basic area map including the above information before the operation area 1 starts to operate.

The area map that is stored by the area map recorder unit 10 before the operation area 1 starts to operate is generated by the area map recorder unit 10 or the management unit 8, for example, using a plurality of images captured by the imaging cameras 4. The supervisor of the operation area 1, the operator 5, or the like may add information to the area map thus generated. Behaviors (particularly, traffic lines) of the operator 5 are recorded in the area map. The area map recorder unit 10 sends the stored area map to the management unit 8 in response to a request from the management unit 8. The area map recorder unit 10 also receives an area map where the traffic lines, etc. of the operator 5 are recorded from the management unit 8, and records the received area map therein. The area map recorded in the area map recorder unit 10 may be output from the management system 2 in response to a request from the supervisor of the operation area 1 or the like.

The identifying information acquirer unit 12 has a function to acquire the identifying information of the operator 5 using images captured by the imaging cameras 4. Specifically, the identifying information acquirer unit 12 extracts the target 11 imaged for acquiring the identifying information from the captured images, and analyzes the extracted target 11. If the target 11 imaged for acquiring the identifying information is a code such as a bar code, a two-dimensional code, or the like, then the identifying information acquirer unit 12 analyzes the code. The identifying information and the target 11 imaged for acquiring the identifying information have been described above in detail. If not all the identifying information is contained in the code or the like, then the identifying information acquirer unit 12 sends an inquiry about the result of the analysis of the code or the like to another memory or the like, and acquires the identifying information. The identifying information acquirer unit 12 then sends the acquired identifying information to the management unit 8. The identifying information acquirer unit 12 also analyzes the face 11*a* of the operator 5 and extracts features thereof. For example, the identifying information acquirer unit 12 extracts features of the face 11*a* from the contours of the right eye, the left eye, the nose, the mouth, the ears, outline of the face, and their relative positional relationships, checks the extracted features against the features of the faces of all operators 5 stored in the other memory, and identifies the operator 5 included in the captured images. The identifying information acquirer unit 12 sends an inquiry to the memory where the identifying information is stored, and acquires the identifying information of the identified operator 5. The identifying information acquirer unit 12 sends the acquired identifying information to the management unit 8.

The traffic line extractor unit 14 has a function to extract traffic lines 9 of the operator 5 from the images captured by the imaging cameras 4. Specifically, the traffic line extractor unit 14 focuses on a particular region, e.g., head, of the operator 5 included in a captured image, and extracts the position of the region. The traffic line extractor unit 14 performs such an extracting process on each of the captured images and joins the positions extracted from the captured images, thereby extracting the traffic lines 9 of the operator 5. The traffic line extractor unit 14 sends the extracted traffic lines 9 to the management unit 8. The management unit 8 cooperates with the area map recorder unit 10, the identifying information acquirer unit 12, and the traffic line extractor unit 14 in recording the traffic lines 9 of the operator 5 in the operation area 1 on the area map. In other words, the management unit 8 records, on the area map read from the area map recorder unit 10, the traffic lines 9 of the operator 5 extracted by the traffic line extractor unit 14 in relation to the identifying information of the operator 5.

Figure 5:
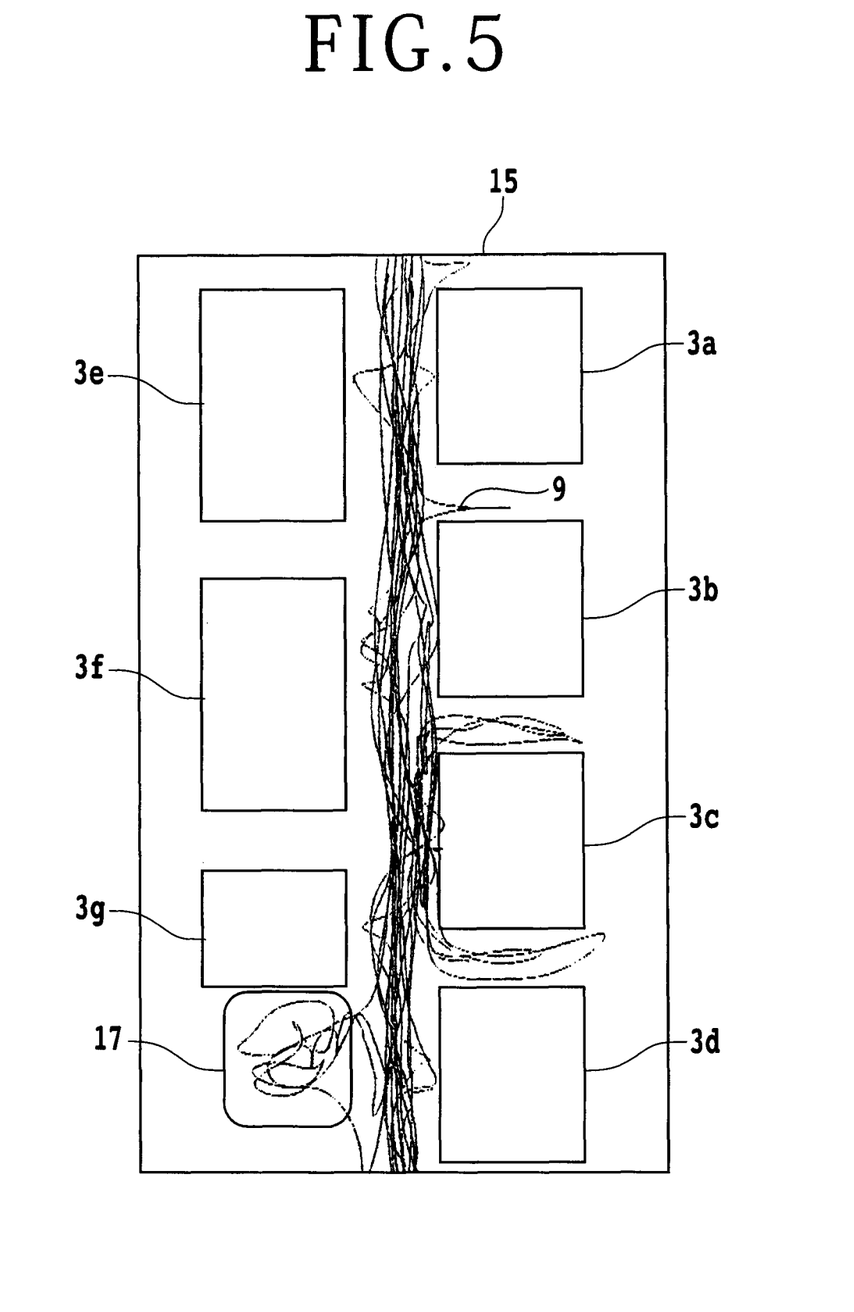
FIG. 5 is a schematic view showing an area map and traffic lines recorded in the area map.

The area map where the traffic lines 9 of the operator 9 are recorded is schematically shown by way of example in FIG. 5. As shown in FIG. 5, the management system 2 according to the present embodiment produces an area map 15 where the traffic lines 9 of the operator 9 are recorded in detail. The area map 15 where the traffic lines 9 of the operator 5 are recorded is useful in coming up with suggestions for improvement about the layout of the processing apparatus 3 in the operation area 1 and the behaviors of the operator 5. For example, the supervisor of the operation area 1 grasps the traffic lines 9 of a plurality of operators 5 using the area map 15, and if the supervisor finds a region where the traffic lines 9 are too closely packed, then the supervisor can alter the layout of the processing apparatus 3 in order to make the traffic lines 9 less closely packed. If the supervisor thinks that the traffic lines 9 of an operator 5 are inadequate, then the supervisor can advise the operator 5 to improve the behaviors of the operator 5. When the traffic lines 9 are displayed on the area map 15, renditions of the traffic lines 9, such as the colors, thicknesses, etc. of the traffic lines 9 may be changed over time to allow the supervisor or the like to be aware of the elapse of time instinctively. The supervisor can thus grasp instinctively not only the paths through which the operator 5 has moved, but also how fast the operator 5 has moved through the paths and in what sequence the operator 5 has taken the paths.

The appropriate pattern storage unit 16 stores therein a predefined pattern appropriate (appropriate pattern) for behaviors (particularly, traffic lines) of the operator 5 in the operation area 1. The appropriate pattern storage unit 16 is connected to the decision unit 20, and has a function to send the stored appropriate pattern to the decision unit 20 when the decision unit 20 is to determine whether the behaviors (particularly, traffic lines) of the operator 5 are appropriate or not. The predefined appropriate pattern is established for the operation area 1 depending on the operations that the predetermined operator 5 is required to perform. For example, if the operator 5 performs operations using the processing apparatus 3, an area where the operator 5 can control the processing apparatus 3 (control area) is established as an appropriate pattern for the traffic lines. On the other hand, if the operator 5 performs operations for carrying the work lot 7 between two of the processing apparatus 3, for example, then a path through which the operator 5 moves over the shortest distance between the two processing apparatus 3 is established as an appropriate pattern for the traffic lines.

The decision unit 20 is connected to the appropriate pattern storage unit 16, the indicator 18, and the management unit 8. The decision unit 20 reads the traffic lines 9 of the operator 5 from the management unit 8 and also reads the appropriate pattern of traffic lines from the appropriate pattern storage unit 16. The decision unit 20 compares the traffic lines 9 and the appropriate pattern with each other, and determines whether they agree or disagree with each other.

Specifically, if the traffic lines 9 of the operator 5 do not deviate from a region set as the appropriate pattern, then the decision unit 20 decides that the traffic lines 9 and the appropriate pattern agree with each other, and if the traffic lines 9 of the operator 5 deviate from the region set as the appropriate pattern, then the decision unit 20 decides that the traffic lines 9 and the appropriate pattern disagree with each other. If the decision unit 20 decides that the traffic lines 9 and the appropriate pattern disagree with each other, then the decision unit 20 may generate information representing how much the traffic lines 9 of the operator 5 deviate from the region, etc.

An example of a decision process performed by the decision unit 20 will be described below with reference to the area map shown in FIG. 5. As shown in FIG. 5, the area map 15 records therein the traffic lines 9 of the operator 5, allowing the user to grasp in detail the manner in which the operator 5 has moved between the processing apparatus 3. For example, if a region between the processing apparatus 3 is set as the appropriate pattern, then the decision 20 decides that those traffic lines 9 which have portions on a deviation 17 from the appropriate pattern disagree with the appropriate pattern. The decision unit 20 may generate information representing the deviation 17 from the appropriate pattern.

The decision unit 20 sends the result of the decision process to the management unit 8, and the management unit 8 stores therein the received result of the decision process. The decision unit 20 also sends the result of the decision process to the indicator 18. The indicator 18 may be disposed within the operation area 1, or on one of the processing apparatus 3, or outside of the operation area 1. The indicator 18 has a function to indicate the result of the decision process to the operator 5 or the supervisor of the operation area 1. In FIG. 2, the indicator 18 is shown as including an indicator 18a mounted on the ceiling of the operation area 1 and an indicator 18b mounted on one of the processing apparatus 3. The indicator 18 may have a function to emit red light or green light, and may emit green light when the result of the decision process shows agreement between the traffic lines 9 and the appropriate pattern, and may emit red light when the result of the decision process shows disagreement between the traffic lines 9 and the appropriate pattern. The indicator 18 may also have a function to generate an alarm sound, and may not be energized when the result of the decision process shows agreement between the traffic lines 9 and the appropriate pattern, and may produce the alarm sound when the result of the decision process shows disagreement between the traffic lines 9 and the appropriate pattern. If the period of time taken after the imaging cameras 4 have imaged the operator 5 until the indicator 18 indicates the result of the decision process is sufficiently short, then since the operator 5 at work can be warned of a deviation from the appropriate pattern on site, the behavior of the operator 5 can immediately be corrected.

The appropriate pattern storage unit 16 may store therein a pattern inappropriate (inappropriate pattern) for behaviors (particularly, traffic lines) of the operator 5. If this is the case, then when the decision unit 20 decides that the traffic lines 9 of the operator 9 agree with the inappropriate pattern, the indicator 18 issues a warning to the operator 5 or the like. Moreover, the management system 2 according to the present embodiment senses entry of the operator 5 into the control area of any one of the processing apparatus 3, and automatically displays an operation menu suitable for the operator 5 on a control panel of the processing apparatus 3. At this time, the operator 5 does not need to take any special action on the processing apparatus 3.

The operation menu controller unit 22 is connected to the management unit 8 and the processing apparatus 3, and has a function to control operation menus displayed on the control panel of each of the processing apparatus 3. When the management unit 8 detects entry of the operator 5 into the control area of one of the processing apparatus 3 on the basis of the images captured by the imaging cameras 4, the management unit 8 sends the identifying information of the operator 5 to the operation menu controller unit 22. In response to the identifying information of the operator 5, the operation menu controller unit 22 displays an operation menu suitable for the operator 5 on the control panel of the processing apparatus 3. The operation menu suitable for the operator 5 refers to an operation menu that allows the operator to perform operations under the authority which the operator 5 has, operations to be carried out next by the operator 5, etc.

Operators 5 who may be assigned to the operation area 1 engage in given operations at suitable processing apparatus 3, respectively. The greater the number of required operation steps is and the more the processing apparatus 3 are involved, the higher the possibility that the operators 5 will make mistakes becomes. For example, in a factory for manufacturing semiconductor device chips, the processing apparatus 3 that are installed range over a variety of types, and a single work lot 7 may be processed in up to several hundred operation steps. Consequently, there is a certain possibility that each operator 5 will make mistakes while performing operations. The management system 2 according to present embodiment deals with such a problem as follows: When the controller 6 detects entry of the operator 5 into the control area of any one of the processing apparatus 3 on the basis of the traffic lines 9 of the operator 5 and the identifying information of the operator 5, the controller 6 displays an operation menu suitable for the operator 5 on the control panel of the processing apparatus 3. At this time, the operator 5 does not need to take any special action on the processing apparatus 3, such as entering its identifying information into the processing apparatus 3, but may operate on the control panel according to the displayed control menu. Accordingly, the operator 5 is free of an excessive burden, and the possibility that the operator 5 will make mistakes in performing operations is reduced. When the operator 5 enters the control area of one of the processing apparatus 3 which is not scheduled for duty, the controller 6 may display the unauthorized entry on the control panel of the processing apparatus 3, and may make the processing apparatus 3 uncontrollable, thereby completely eliminating the possibility that the operator 5 will erroneously control the processing apparatus 3 which is not scheduled for duty.

As described above, the management system 2 according to the present embodiment is able to accumulate data about the behaviors of the operator 5 without forcing the operator 5 to perform special operations, using a code (identification mark) or the like applied to the working clothes worn by the operator 5. The management system 2 can also record the behaviors of the operator 5 automatically and in an objective way on the basis of the images captured by the imaging cameras 4. As the behaviors of the operator are automatically recorded, there will be no mistake in recording the behaviors of the operator.

The present invention is not limited to the above embodiment, but various changes and modifications may be made in the embodiment. For example, according to the above embodiment, the traffic lines 9 of the operator 5 are focused on and described as information about the behaviors of the operator 5 that are grasped using the imaging cameras 4. However, the management system 2 may accumulate information about the orientation of the operator 5, and may detect when the operator 5 faces in an inappropriate direction, so that the indicator 18 may give the operator 5 a warning about the wrong orientation of the operator 5. Furthermore, the management system 2 may monitor control actions on the processing apparatus 3, and hence may determine whether the operator 5 has been performing a given operation at a sufficient level of expertise or not or whether the operator 5 has not been behaving beyond certain standard limits. If the management system 2 decides that the operator 5 has not been performing the given operation at the sufficient level of expertise, then the management system 2 can take suitable measures, e.g., giving a guidance to the operator 5.

The management system 2 are connected to the processing apparatus 3 installed in the operation area 1, and may acquire information about the availability of the processing apparatus 3. If the management system 2 reviews the availability information together with the image information acquired from the imaging cameras 4, the management system 2 makes it possible to study and offer sophisticated suggestions for improvement. The management system 2 may also analyze the acquired information in real time to detect a defect in the operation area 1, and if the management system 2 detects such a defect, then it may indicate the defect immediately to the supervisor of the operation area 1 or the like. The supervisor may then control the management system 2 to instruct the operator 5 and the processing apparatus 3 to deal with the defect. The management system 2 may also be used to provide healthcare to the operator 5. Specifically, the management system 2 may generate information about the fatigue of the operator 5 from the activity of the operator 5, and may give a rest to the operator 5 which has fatigued to a certain extent so as to keep the operator 5 active above a certain level. In addition, the management system 5 may be used to assess the working posture of the operator 5. The management system 2 thus used for working posture assessment is able to detect operators 5 who are taking an unnecessarily long rest or operators 5 who are committing neglect of duty.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A management system for supervising a predetermined operator within an operation area with at least one processing apparatus installed therein, the management system comprising:
    at least one imaging camera for capturing an image of the predetermined operator having an identifying information indicating an identity of the predetermined operator registered in the management system prior to the capturing of the image of the predetermined operator; and
    a controller having a plurality of functional units each for performing a corresponding function, said functional units including,
        an area map recorder unit for storing an area map that includes information about the processing apparatus installed in the operation area and information about the positions of the processing apparatus;
        an identifying information acquirer unit for acquiring said identifying information indicating the identity of the predetermined operator on the basis of the image captured by said imaging camera;
        a traffic line extractor unit for extracting traffic lines indicating routes traveled by the predetermined operator within the operation area from the image captured by said imaging camera;
        a management unit for recording the extracted traffic lines of the predetermined operator which have been extracted by said traffic line extractor unit and the identifying information of the predetermined operator on the area map read from said area map recorder unit;
        an appropriate pattern storage unit for storing a predefined appropriate pattern of traffic lines indicating predetermined routes to be traveled by the predetermined operator within the operation area; and
        a decision unit for performing a decision process for reading the predefined appropriate pattern of traffic lines from said appropriate pattern storage unit and determining whether the recorded traffic lines and the predefined appropriate pattern of traffic lines agree or disagree with each other.

2. The management system according to claim 1, further comprising
    an indicator for indicating the result of the decision process performed by said decision unit.

3. The management system according to claim 1, wherein said functional units of said controller further comprises an operation menu controller unit for controlling an operation menu for operating the processing apparatus;
    said management unit sends the identifying information of the predetermined operator to said operation menu controller unit when the predetermined operator enters a control area established with respect to the processing apparatus; and said operation menu controller unit displays an operation menu suitable for the predetermined operator on a control panel of the processing apparatus.

4. The management system according to claim 1, wherein said identifying information is acquired using a face of the predetermined operator, a bar code, or a two-dimensional code that is included in the image of the predetermined operator captured by said imaging camera.

5. The management system according to claim 1, wherein said at least one imaging camera is mounted on the processing apparatus installed in the operation area.

6. The management system according to claim 1, wherein said identifying information includes orientation information representing the orientation of a body of the predetermined operator.

* * * * *